United States Patent
Manoogian

[15] 3,700,210
[45] Oct. 24, 1972

[54] FAUCET VALVE
[72] Inventor: Alex Manoogian, Grosse Pointe Farms, Mich.
[73] Assignee: Masco Corporation, Taylor, Mich.
[22] Filed: July 27, 1971
[21] Appl. No.: 166,542

[52] U.S. Cl...................................251/304, 251/209
[51] Int. Cl.................................................F16k 5/22
[58] Field of Search......251/118, 120, 209, 304, 309, 251/310, 312, 315

[56] References Cited

UNITED STATES PATENTS 3,645,493   2/1972   Manoogian............251/209 X

*Primary Examiner*—Henry T. Klinksiek
*Attorney*—L. Gaylord Hulbert et al.

[57] ABSTRACT

A faucet valve in which a rotatable valve member has a spherical valve surface and a passage including an inlet in the spherical surface which is offset from the axis of rotation and rotatable into and out of registry with a similarly offset inlet port in the valve body, and a laterally extending outlet terminating in an annular channel in the spherical surface and communicating with an outlet port in the valve body. The annular channel on the valve surface defines a restricted passage through which water flows when there is only slight registry of the inlet ports in the valve member and valve body to create a back pressure which muffles turbulence and reduces noise.

4 Claims, 5 Drawing Figures

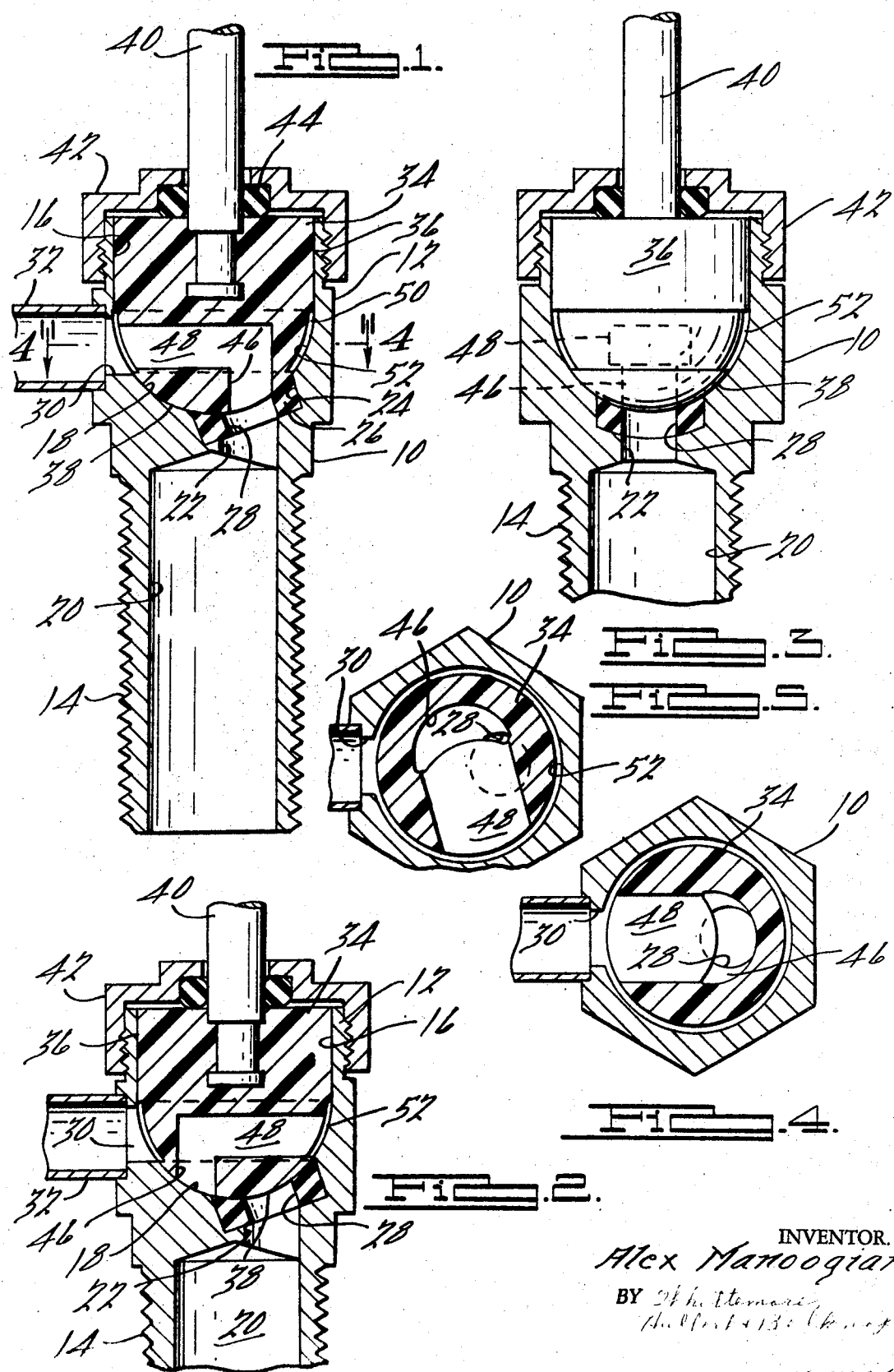

FAUCET VALVE

Hot and cold water faucets in which a separate valve controls each supply line are generally of the compression type. It has heretofore been proposed to employ a valve member having an inlet port offset from the axis of rotation of the valve member and rotatable over a similarly offset inlet port in the valve body to reduce wear on the valve seats, which is an inherent disadvantage in compression type faucets. According to the present invention the valve member has a cylindrical portion which is rotatably mounted in the valve body and a spherical valve surface at its lower end which seats against a corresponding surface in the valve body. The valve member has a passage therein having its inlet end in the valve surface and rotatable into and out of registry with the inlet port in the valve body with the outlet terminating in an annular channel of small cross section on the spherical valve surface through which water flows when the valve is only partially open to create a back pressure at the inlet port which serves to muffle turbulence and reduce noise. As the valve is opened further the back pressure is decreased until there is full registration of the outlet passage in the valve member with the outlet port in the valve body.

In the drawings:

FIG. 1 is a vertical sectional view through a faucet valve constructed according to the present invention and showing the same in the full open position;

FIG. 2 is a view similar to FIG. 1, showing the valve in its closed position;

FIG. 3 is a vertical sectional view taken in a plane turned 90° to the plane of FIG. 1;

FIG. 4 is a sectional view taken on line 4—4 of FIG. 1 and showing the valve in its full open position; and FIG. 5 is a view similar to FIG. 4, showing the valve in a partially open position.

The valve includes a valve body 10 having a cylindrical externally threaded upper end 12 and an externally threaded lower end 14 which is adapted to be connected in a conventional manner to a hot or cold water supply line. The upper end 12 of the valve body has an upwardly opening valve chamber which includes an upper cylindrical portion 16 and a lower concave spherical portion 18. Water is supplied to the bore 20 in the lower end of the valve body through an inlet passage 22 which is offset from the axis of the valve body and includes an angularly disposed counterbore 24 which opens into the spherical bottom wall 18 of the valve chamber. A valve seat member 26 is disposed in the counterbore 24 and has an opening 28 therein which defines the inlet port in the valve body 10. The valve body has a laterally extending outlet port 30 opening from the spherical portion 18 of the valve chamber, and a pipe 32 connected to the outlet port 30 leads to a discharge spout.

A valve member 34 includes an upper cylindrical portion 36 rotatable within the cylindrical upper end 16 of the valve body and a lower end having a spherical valve surface 38 seated against the corresponding spherical surface 18 in the valve body. A valve stem 40 has its lower end embedded in the cylindrical portion 36 of the valve member 34, the latter preferably being made of plastic. A handle (not shown) is secured on the upper end of the stem 40 for rotating the valve member 34 between open and closed positions.

An end cap 42 is threaded onto the upper end of the valve body 10 and an O-ring 44 provides a seal through which the stem 40 extends. A suitable seal may also be provided between the cap 42 and the upper end of the valve body.

The valve member 34 has a passage therein which includes a vertically extending inlet end 46 which is crescent-shaped in cross section and opens into a low pressure cavity 48 which has a rectangular cross section as shown in FIG. 3. The cavity 48 extends laterally through the valve member 34 and opens into the spherical valve surface 38 of the valve member. The valve surface is undercut as at 50 to define an annular channel 52 between the valve member 34 and the valve body 10. The channel 52 is of relatively small cross sectional area and extends entirely around the valve member 34. The outlet end of the cavity 48 opens into the annular channel 52.

The valve member is shown in FIG. 2 in its closed position in which the valve member 34 has been rotated by means of stem 40 to a position in which the inlet 46 of the passage in the valve member 34 is out of registry with the inlet port 28 in the valve body. As the valve member 34 is rotated in a clockwise direction as viewed in FIG. 5 toward its open position, the inlet 46 in the valve member 34 will be brought into registration with the inlet port 28 in the valve body. FIG. 5 illustrates the relationship of the ports 46 and 28 when the valve first begins to open. When there is only slight registration between the ports 28 and 46 as shown in FIG. 5, turbulence will exist at the inlet port. However, the water immediately flows into the low pressure cavity 48 but at this position of the valve member the cavity 48 is not aligned with the outlet port 30 in the valve body and water can only reach the outlet port 30 by flowing through the restricted passage offered by the annular channel 52 between the valve member 34 and the valve body. The restricted discharge of water creates a back pressure at the inlet port which reduces turbulence at the inlet port, thereby reducing the noise of operation of the valve. As the valve member is moved further toward its full open position, the increased flow through the crescent-shaped inlet port 46 gradually reduces the back pressure in the cavity 48 and at the inlet port since the cavity 48 is moved closer to the outlet port 30 in the valve body. When the cavity 48 begins to be aligned with the outlet port 30, the back pressure is further reduced, and at full open position as shown in FIG. 4, the cavity is fully aligned with the outlet port 30.

It will be apparent that the valve may be provided with suitable stops (not shown) which define the closed and full open positions of the valve member 34 and that the stops may be so arranged that the valve member is rotatable from closed to open position in either a clockwise or counterclockwise direction as desired.

What I claim as my invention is:

1. A faucet valve comprising a valve body, a valve chamber in said valve body having a concave spherical surface at its lower end, said valve body having an inlet port opening into said spherical surface and offset from the axis of said chamber, and an outlet port opening from said spherical surface and extending generally radially relative to said axis, a valve member rotatably supported in said valve body and having a spherical portion seated against said spherical surface, said valve member having a passage therethrough having its inlet in said spherical portion and offset from said axis whereby said inlet in said valve member is rotatable into and out of registry with said inlet port, said spherical portion of said valve member having a band of reduced diameter spaced from said passage inlet to define an annular restricted channel between said valve member and valve body with said channel in constant communication with said outlet port, said passage in said valve member having its outlet terminating in said channel.

2. A faucet valve comprising a valve body having an upwardly opening cylindrical bore provided with a concave spherical bottom wall, said valve body having an inlet port opening into said bottom wall and offset from the axis of said bore, and an outlet port in said bottom wall, a valve member rotatable in said bore and having a spherical portion seated against said bottom wall, said valve member having a passage therethrough having its inlet in said spherical portion and offset from said axis so as to be movable into and out of registry with said inlet port upon rotation of said valve member, said spherical portion of said valve member having a band of reduced diameter spaced from said passage inlet to define a restricted channel between said valve member and valve body communicating at all times with said outlet port, said passage in said valve member having its outlet in said channel, said inlet and outlet in said valve member and said inlet and outlet ports in said valve body being relatively disposed so that water must flow through said restricted channel to said outlet port when said inlet in said valve member has only slight registration with said inlet port.

3. A valve according to claim 2 wherein said restricted channel extends entirely around said spherical portion and lies in a plane perpendicular to said axis.

4. A valve according to claim 2 wherein said inlet in said valve member extends generally parallel to said axis and said outlet extends generally perpendicular to said axis and is adapted to be brought into alignment with said outlet port in the full open position of said valve member.

* * * * *